United States Patent [19]
Gould et al.

[11] 3,736,486
[45] May 29, 1973

[54] SERVO CONTROL SYSTEM

[75] Inventors: George K. Gould, Roslyn; Armando Belmares Sarabia, Long Beach, both of N.Y.

[73] Assignee: Teletronics International Inc., New York, N.Y.

[22] Filed: Mar. 17, 1972

[21] Appl. No.: 235,634

[52] U.S. Cl. .................. 318/624, 318/678, 318/681
[51] Int. Cl. ............................................. G05b 5/01
[58] Field of Search .................. 318/678, 681, 624, 318/679, 677, 596, 601

[56] References Cited

UNITED STATES PATENTS

| | | | |
|---|---|---|---|
| 3,448,360 | 6/1969 | Pohl | 318/601 |
| 3,628,129 | 12/1971 | Riley | 318/678 X |
| 3,584,203 | 6/1971 | Patzelt | 318/601 X |
| 3,604,907 | 9/1971 | Wesner | 318/624 X |

*Primary Examiner* — B. Dobeck
*Attorney* — Barry Evans, and Gregor N. Neff

[57] ABSTRACT

A digital servo-motor control and drive system is disclosed. A control signal for changing the servo-motor position, and a position signal which is proportional to the servo-motor position are compared with one another by a comparator. A signal proportional to the difference between the control signal and the position signal is delivered to a full-wave rectifier using high-gain differential operational amplifiers. The latter circuit produces a signal which is proportional to the absolute magnitude of the error signal. This error signal is delivered to a second comparator which compares the error signal with a reference signal. When the error signal is equal to or greater than the reference signal, The second comparator changes its output condition to indicate the "match". Logic circuitry is provided for detecting the coincidence between the latter condition of the second comparator and one condition of the first comparator. The detection of such a coincidence produces an output signal over a first lead which drives the servo-motor in one direction. A second drive signal for driving the servo-motor in the opposite direction is produced in response to the detection of coincidence between the match condition of the second comparator and the opposite output condition of the first comparator, thus indicating a reversal of polarity of the difference between the control and position signals. This servo control system has a very precisely controllable "deadband", and is relatively insensitive to electrical noise.

9 Claims, 1 Drawing Figure

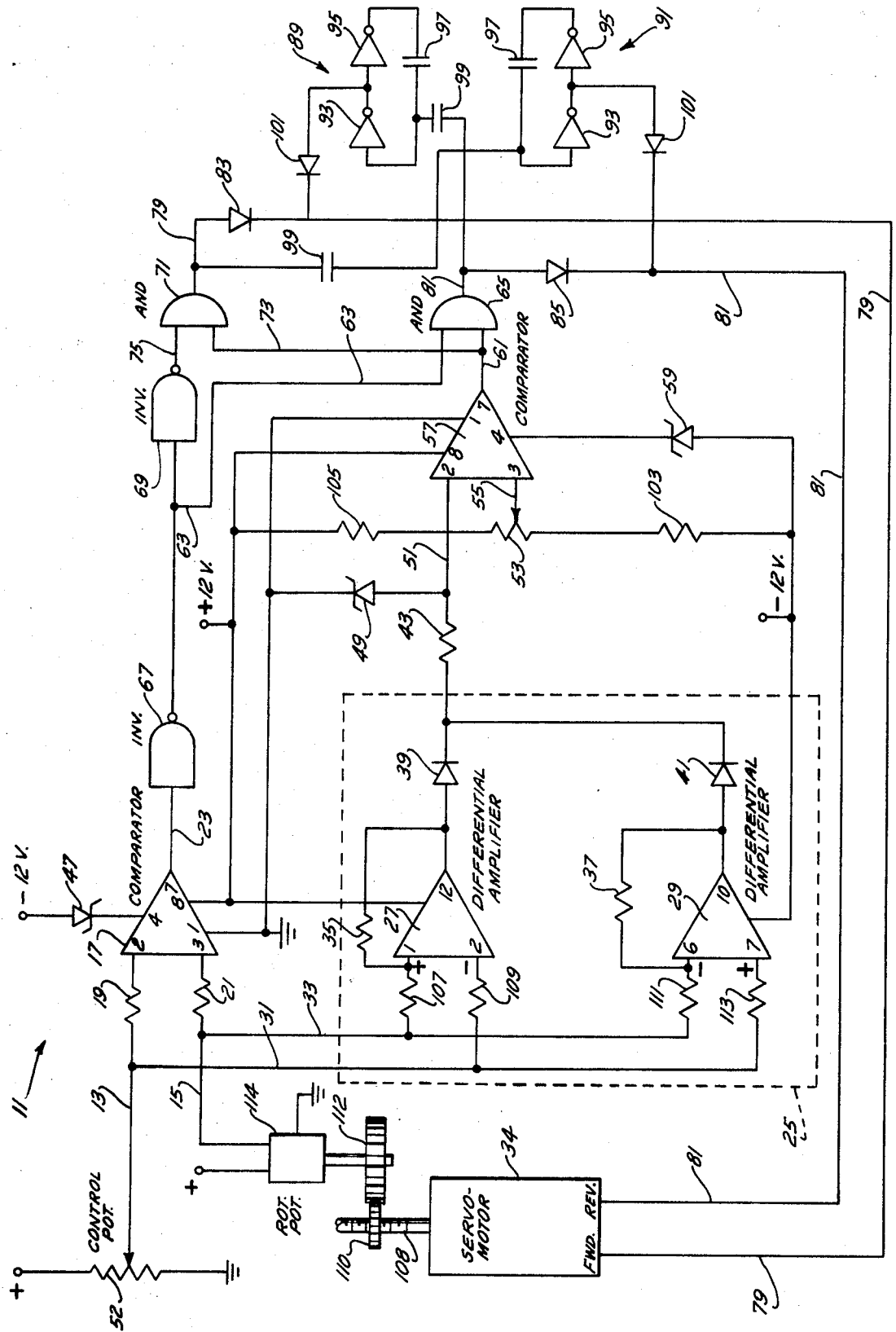

SERVO CONTROL SYSTEM

This invention relates to servo control systems. This invention is particularly useful in controlling servomotors for use in editing images in a motion picture film-to-video tape transfer system, as is described in the co-pending patent application entitled "Editing System and Method" filed on the same date as this application and assigned to the same assignee as this application.

It is an object of the present invention to provide a servo control system which has a deadband which is controllable with great precision, and which is relatively insensitive to electrical noise. It is a further object to provide such a system in which the change from forward to reverse rotation of the servo-motor can be made relatively quickly. It is a further object of this invention to provide such a system which is relatively compact, simple and reliable.

In accordance with the present invention, the foregoing objectives are met by the provision of a servo control system including means for developing a control signal and a servo position signal. A first comparator produces different output conditions in response to different polarities of the difference between the control and position signals. A deadband circuit produces a stable reference signal, and an error signal proportional to the absolute value of the difference between the control and position signals. A second comparator compares the error signal with the reference signal, and produces a match output condition when the error signal equals or exceeds the reference signal. Circuit means are provided for delivering a first drive signal to drive the servo-motor in one direction in response to detection of the match output condition of the second comparator and one output condition of the first comparator. Means also are provided for driving the servo-motor in the opposite direction upon the coincidence of detection of a match condition of the second comparator and the opposite condition of the first comparator. Preferably, high-gain differential operational amplifiers are connected in a rectifier circuit arrangement for producing the error signal. Also, it is preferred that the comparators and the differential amplifiers be monolitic integrated circuit devices.

The foregoing and other objects and advantages of the invention will be set forth in or apparent from the following description and drawings.

The single FIGURE of the drawings is a schematic circuit diagram illustrating the control system of the present invention.

The drawings show a servo-motor 34 capable of turning in both the forward and reverse directions. The servo-motor has an output shaft 108 to which is attached a small spur gear 110 driving a larger spur gear 112 which rotates the shaft of a rotary potentiometer 114. The rotary potentiometer produces an output signal on its wiper arm lead 15 which is proportional to the relative position of the servo-motor shaft 108.

A control potentiometer 52 with a wiper arm lead 13 also is provided. The wiper arm is moved to change the input voltage to the servo system so as to change the position of the output shaft 108.

As it was noted at the beginning of this specification, the system is particularly well suited for use in a system for editing motion picture film images for transfer onto video tape. Accordingly, the reference numerals for the servo-motor 34, the control potentiometer 52 and associated components are the same as in the co-pending application referred to at the beginning of the specification. The disclosure of that application is incorporated herein by reference. The servomotor 34 is the servo-motor for moving the "zoom" projection lens shown in that application in the horizontal direction. The control potentiometer preferably is located at the instrument panel of the control unit of the editing system.

The control signal on lead 13 and the position signal on lead 15 are delivered through resistors 19 and 21, respectively, to a first comparator device 17. The comparator device 17 is a conventional integrated circuit device which produces a steady DC output signal on output lead 23 whenever the signal on one input lead is greater than the signal on the other input lead, and it produces no output signal when the two input signals are equal, or the signal on the other output lead is greater than that on the first input lead. Speaking in digital terminology, the output of the comparator 17 is either "0" or "1" depending upon relative polarity and magnitudes of the two input signals.

The input signals to the comparator 17 are delivered over leads 31 and 33 to a full-wave rectifier circuit 25. The output of the rectifier circuit 25 is delivered to one input lead 51 of a second comparator device 57. The comparator device 57 receives on its other input lead a signal from the wiper arm 55 of a potentiometer 53. The potentiometer 53 is connected in a voltage divider circuit consisting of resistors 103 and 105 connected between regulated sources of +12 volts and −12 volts DC. Thus, a stable reference signal is supplied to the comparator 57 on the input lead 55, whereas the full-wave rectified difference between the two input signals on lines 13 and 15 is delivered over input lead 51 of the comparator 57. The input on lead 51 thus is proportional to the absolute magnitude of the difference between the control and the position signals.

The output of the second comparator 57 is delivered over leads 61 and 73 to one input lead each of two AND gates 65 and 71. The output of the first comparator 17 is delivered through an inverter 67 to a lead 63 which goes to the other input of the AND gate 65. The output of inverter 67 is inverted again by another inverter 69, and then is delivered over a lead 75 to the other input of the second AND gate 71.

The output of the first AND gate 65 is delivered through a lead 81 and a diode 85 to the "Reverse" input terminal of the servo-motor 34 so as to drive it in the reverse direction. The output of the second AND gate 71 is delivered through a lead 79 and a diode 83 to the "Forward" input terminal of the servo-motor to drive it in the forward direction.

Neither AND gate 71 or 65 will deliver an output signal to drive the servo-motor unless and until a match signal is received from the second comparator 57. This match signal is produced only when the error signal on lead 51 equals or exceeds the reference signal on lead 55. The first AND gate 65 will be enabled when the output of the first comparator 17 is zero. This is because the output of the inverter 67 then is high, so that both inputs to the AND gate 65 are high, and it produces an output signal. At the same time, however, the output of inverter 69 is "low" (zero) and the AND gate 71 does not have an output signal because one of its inputs has a zero signal on it.

When the output of comparator 17 is high, the output of inverter 67 is low, and the AND gate 65 does not produce an output signal. However, the output of inverter 69 is high so that both inputs to gate 71 are high and a drive signal is supplied over lead 79 to drive the servo-motor in the forward direction.

Two optional circuits 89 and 91 also are provided in order to drive the servo-motor 34 for a very short distance in the opposite direction after it has moved in one particular direction, in order to compensate for "overshoot". Each of the circuits 89 and 91 includes inverting amplifiers 93 and 95, capacitors 97 and 99, and a diode 101, all connected together as shown. When an output signal is produced by AND gate 71 on lead 79, the capacitors of circuit 91 are charged. When the signal is removed from lead 79, the capacitors discharge through the diode 101 and the line 81 to drive the servo-motor in a reverse direction for a short length of time, until the charge on the capacitors has dissipated.

Similarly, when there is a signal on the output lead 81, capacitors in the circuit 89 are charged. When the signal on 81 is removed, the capacitors in circuit 89 discharge, sending a signal through the line 79 to drive the servo-motor 34 for a short distance in the forward direction.

The preferred construction of the full-wave rectifier 25 includes two differential amplifiers 27 and 29. Amplifier 27 is connected with its plus terminal to input lead 33, and its negative terminal to input lead 31. Amplifier 29 is connected in the opposite sense, i.e. with its negative terminal to lead 33 and its positive terminal to lead 31. Thus, when the difference between the control and position signals is positive, one of the differential amplifiers produces an output signal. When the polarity of the difference reverses, the other differential amplifier produces an output signal. Conventional gain-determining feedback resistors 35 and 37 are used to set the gain of the two amplifiers.

The output of each amplifier flows through a diode 39 or 41 to a common point at the left-hand terminal of a current-limiting resistor 43. From that point, the signal goes to lead 51 and to the comparator 57.

The use of differential amplifiers in this manner reduces the sensitivity of the circuit to electrical noise, and to the gain of the individual amplifiers in the circuit. This use also enhances the stability of the deadband provided by the circuit. This deadband can be adjusted quite accurately merely by adjusting the wiper arm 55 of the potentiometer 53. Furthermore, since there is very little time lag in the operation of the comparators, the system can shift from producing a forward servo-motor drive signal to producing a reverse drive signal in a very short length of time.

Preferably, each of the comparators and differential amplifiers is a monolithic integrated circuit, or a combination of such devices. The numbers inside the triangles representing the differential amplifiers and comparators are the terminal numbers on the integrated circuit devices themselves.

The following table gives values and component identification for a circuit which has been operated successfully in accordance with the present invention.

| Component | Identification |
| --- | --- |
| Comperators 17 and 57 | UA 710 |
| Differential Amplifiers 27 and 29 | UA 747 |
| Inverters 67 and 69 | UA 9002 |
| Inverting Amplifiers 93 and 95 | UA 9016 |
| AND Gates 71 and 65 | A NAND Gate UA 9002 In series with an inverting amplifier UA 9112 |
| Resistors 19, 21, 103, 105, 109, 111 and 113 | 5000 ohms |
| Resistors 35 and 37 | 1.2 megohms |
| Zener diodes 47, and 59 | IN746A |
| Diodes 39, 41, 83, 85 and 101 | IN976 |
| Potentiometer 53 | 500 ohms |
| Capacitors 97 | 150 micromicrofarad |
| Capacitors 99 | 0.1 microfarad |

The above description of the invention is intended to be illustrative and not limiting. Various changes or modification in the embodiment described may occur to those skilled in the art and these can be made without departing from the spirit or scope of the invention.

We claim:

1. A servo-motor control system comprising means for developing a control signal, means for developing a position signal for indicating the position of the servo-motor output relative to a reference position, first comparator means for producing a first output condition when one of said position and control signals is larger than the other, and for producing a second output condition when said other signal is larger than said one signal, means for producing an error signal proportional to the absolute value of the difference between said control and position signals, means for developing a reference signal, second comparator means for producing a match output condition when said error signal equals or exceeds said reference signal, means for delivering a first drive signal to said servo-motor to drive it in one direction in response to the coincident detection of a first output condition of said first comparator means and the match output condition of said second comparator means, and means for delivering a second drive signal to drive said servo-motor in the opposite direction in response to the coincident detection of the second output condition of said first comparator means and the match output condition of said second comparator means.

2. A system as in claim 1 in which each of said comparator means comprises circuit means for producing an output signal in one of its output conditions, and no output signal in the other of its output conditions.

3. A system as in claim 1 in which each of said comparator means is an integrated circuit device.

4. A system as in claim 1 including means for developing a transient drive signal to drive said servo-motor in the opposite direction after movement in the one direction, in order to correct for over-shoot.

5. A servo-motor control system comprising means for developing a control signal, means for developing a position signal for indicating the position of the servo-motor output relative to a reference position, first comparator means for producing a first output condition when one of said position and control signals is larger than the other, and for producing a second output condition when said other signal is larger than said one signal, full-wave rectifier means connected for detecting and rectifying the difference between said control and position signals for producing an error signal proportional to the absolute value of the difference between said control and position signals, means for developing a reference signal, second comparator means for producing a match output condition when said error signal equals or exceeds said reference signal, means for delivering a first drive signal to said servo-motor to drive it in one direction in response to the coincident detection of a first output condition of said first comparator means and the match output condition of said second comparator means, and means for delivering a second drive signal to drive said servo-motor in the opposite direction in response to the coincident detection of the second output condition of said first comparator means and the match output condition of said second comparator means.

6. A system as in claim 5 in which said rectifier includes a pair of high-gain differential amplifiers, the input terminals of each being connected with opposite polarity to lines upon which said control and position signals appear, and the output of each being delivered to a common output terminal.

7. A system as in claim 6 in which said common output terminal is connected to one input terminal of said second comparator means, and said reference signal means is connected to a second input terminal of said second comparator means.

8. A system as in claim 6 in which each of said differential amplifiers is an integrated circuit device.

9. A servo-motor control system comprising means for developing a control signal, means for developing a position signal for indicating the position of the servo-motor output relative to a reference position, first comparator means for producing a first output condition when one of said position and control signals is larger than the other, and for producing a second output condition when said other signal is larger than said one signal, means for producing an error signal proportional to the absolute value of the difference between said control and position signals, means for developing a reference signal, second comparator means for producing a match output condition when said error signal equals or exceeds said reference signal, means for delivering a first drive signal to said servo-motor to drive it in one direction in response to the coincident detection of a first output condition of said first comparator means and the match output condition of said second comparator means, and means for delivering a second drive signal to drive said servo-motor in the opposite direction in response to the coincident detection of the second output condition of said first comparator means and the match output condition of said second comparator means, each of said comparator means comprising circuit means for producing an output signal in one of its output conditions, and no output signal in the other of its output conditions, said means for delivering said first and second drive signals to said servo-motor including a pair of AND gates, each receiving the output from said second comparator as one input, one AND gate receiving the uninverted output of said first comparator means, and the other AND gate receiving the inversion of the output of said first comparator means, the output of one of said AND gates being connected to the forward-drive input terminal of said servo-motor, and the output of the other AND gate being connected to the reverse-drive input terminal of said servo-motor.

* * * * *